Oct. 17, 1939.    G. R. PFLASTERER    2,176,612

RAILWAY TRACK CIRCUIT

Filed June 11, 1937

INVENTOR
George R. Pflasterer.
BY
HIS    ATTORNEY

Patented Oct. 17, 1939

2,176,612

UNITED STATES PATENT OFFICE 2,176,612

RAILWAY TRACK CIRCUIT

George R. Pflasterer, Swissvale, Pa., assignor to The Union Switch & Signal Company, Swissvale, Pa., a corporation of Pennsylvania Application June 11, 1937, Serial No. 147,700

11 Claims. (Cl. 246—41)

My invention relates to railway track circuits, and has for an object the provision of new and novel means for improving the shunting sensitivity of track circuits.

I shall describe several forms of track circuits embodying my invention, and shall then point out the novel features thereof in claims.

Figure 1:
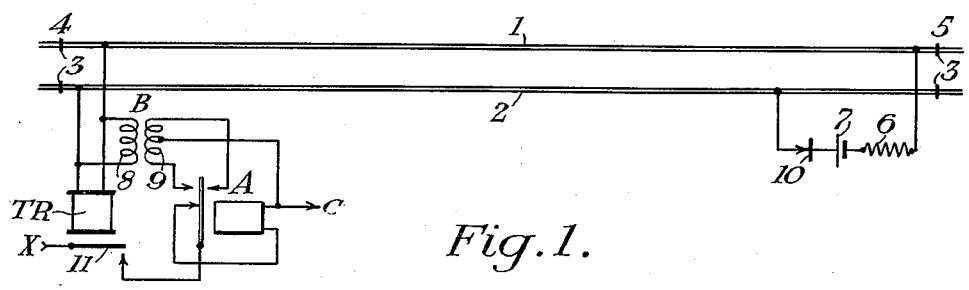
Figure 2:
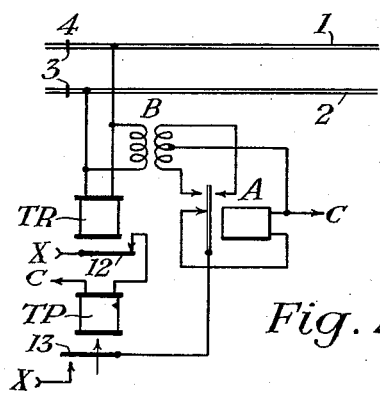
Figure 3:
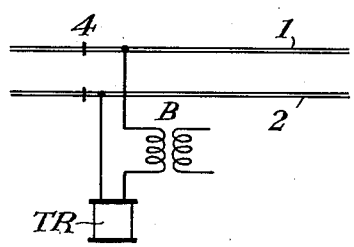
Figure 4:
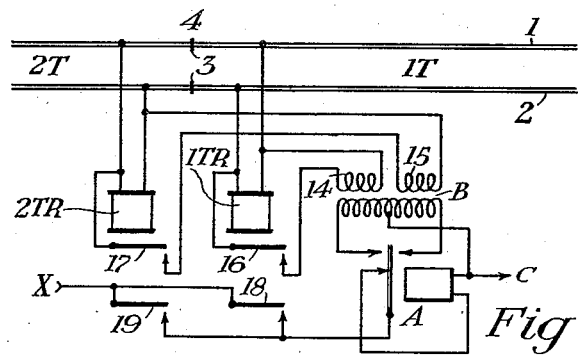
Figure 5:
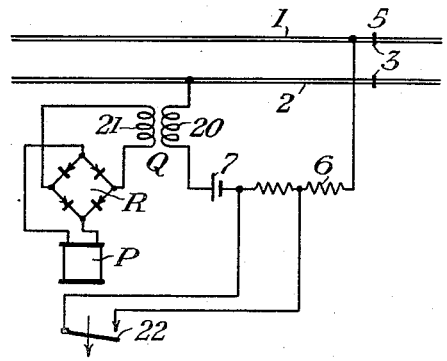
Figure 6:
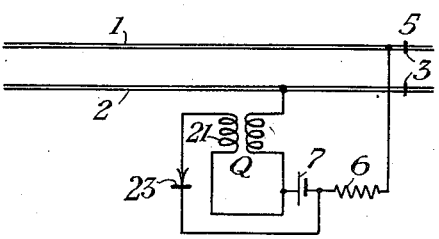

In the accompanying drawing, Fig. 1 is a diagrammatic view illustrating one form of track circuit embodying my invention. Figs. 2, 3, and 4 are diagrammatic views illustrating modifications of the apparatus at the relay end of the track circuit shown in Fig. 1, and each also embodying my invention. Figs. 5 and 6 are diagrammatic views illustrating modifications of the apparatus at the battery end of the track circuit shown in Fig. 1, and each also embodying my invention.

Similar reference characters refer to similar parts in each of the several views.

Referring first to Fig. 1, the reference characters 1 and 2 designate the track rails of a railway track which rails are divided by insulated joints 3 to form a track section 4—5. Connected across the rails 1 and 2 at one end of the section is a direct current relay designated by the reference character TR. Connected across the track rails at the other end of the track section by a resistor 6 is a track battery 7. The resistor 6 is adjusted to such a value that the current received by the track relay TR is sufficient to hold the relay up, but is not sufficient to pick the relay up. It follows, therefore, that since the relay TR is provided with only holding current, a train shunt of comparatively high resistance will cause the relay to become released. In order to supply pick-up current for the relay TR, I provide a transformer B having its secondary winding 8 connected across the track rails in multiple with the relay TR and having its primary winding 9 connected to a device A for converting direct current into alternating current and here shown as the well-known tuned reed alternator. I also provide an asymmetric unit 10 poled to pass current in the same direction as battery 7 and connected in series with battery 7.

When section 4—5 becomes occupied by a train so that track relay TR becomes released, the closing of back contact 11 of track relay TR will initiate the operation of alternator A by supplying it with direct current from any convenient source of direct current, the terminals of which are designated by the reference characters X and C. The operation of alternator A will induce alternating current in secondary winding 8 of transformer B, but this current cannot flow to the battery end of the section because of the shunting action of the wheels and axles of the train and cannot flow into track relay TR because the impedance of this relay is of such value as to prevent the flow of alternating current therein. When the train vacates the section, however, one-half of each wave of the alternating current supplied to the rails by secondary winding 8 is shunted away from the relay TR by the asymmetric unit 10 so that the relay receives only the other half of each wave. These half waves received by the relay TR constitute a pulsating unidirectional current to which the relay is, of course, responsive. This additional current supplied to the relay TR, together with the usual current supplied by the battery 7, causes the relay to become picked up and thereby open its back contact 11 to disconnect energy from alternator A. It will be understood that the value of the current supplied by transformer B to relay TR is such that this relay will be certain to become effectively energized when the section 4—5 is vacated by a train even though the operation of alternator A ceases at the moment back contact 11 of relay TR becomes opened. It will also be understood that the resistance of secondary winding 8 is of such value that the flow of direct current in this winding from battery 7 is practically negligible.

Referring now to Fig. 2, the reference character TP designates a relay which is here shown as having a slow pick-up characteristic and which is controlled by a front contact 12 of relay TR. That is, relay TP becomes energized or deenergized according as the relay TR is picked up or released, respectively. The operation of alternator A is controlled by back contact 13 of repeating relay TP. With this arrangement the voltage supplied to the track rails by the transformer B may be reduced somewhat because owing to the slow pick-up characteristic of relay TP there is no possibility of the operation of alternator A ceasing before track relay TR becomes effectively energized.

Referring next to Fig. 3, secondary winding 8 of transformer B is here shown connected in series with relay TR rather than in multiple as shown in the previous figures. With this arrangement asymmetric unit 10 permits the passage of each half wave of the alternating current which is flowing in the proper direction to energize relay TR, but prevents the flow of the other half waves which flow in the opposite direction. Consequently, relay TR is supplied with a pulsating unidirectional current to which the relay is responsive.

Referring next to Fig. 4, the reference characters 1T and 2T designate two successive sections of railway track and having their track relays 1TR and 2TR located at adjacent ends of their respective sections. Transformer B is provided with two secondary windings 14 and 15. Winding 14 is connected across the track rails of section 1T by back contact 16 of track relay 1TR and winding 15 is connected across the track rails of section 2T by back contact 17 of track relay 2TR. The closing of either back contact 18 of relay 1TR or back contact 19 of relay 2TR will cause the operation of alternator A. Thus, when either section is occupied, the operation of alternator A will be initiated, but only the rails of the section associated with the track relay which is released will be supplied with alternating current energy. It will be seen, therefore, that one alternator may be utilized to provide pick-up current for the track relay associated with two different track sections.

Referring now to Fig. 5, the reference character Q designates a transformer having its primary winding 20 connected in series with battery 7. An auxiliary relay P is connected by a full wave rectifier R to secondary winding 21 of transformer Q. When rails 1 and 2 are supplied with alternating current and the section is unoccupied, relay P will become picked up to close its front contact 22. The closing of front contact 22 of relay P will shunt a portion of resistor 6 so that battery 7 will supply additional energy to the rails to cause pick up of the track relay at the other end of the track section. The relay P is provided with a slow releasing characteristic so that a portion of the resistor 6 will remain shunted for a period of time sufficient to insure effective energization of the track relay even though alternating current becomes disconnected from the rails as soon as the back contact of the track relay becomes opened.

Referring now to Fig. 6, secondary winding 21 of transformer Q is connected by asymmetric unit 23 across the terminals of track battery 7. Asymmetric unit 23 is poled so as to pass to rails 1 and 2 only the half waves of alternating current which are flowing in the same direction as the current from battery 7. The resulting unidirectional current increases the difference of potential across the rails 1 and 2 to a value sufficient to insure pick up of the track relay at the other end of the track section.

While for the sake of simplicity I have shown only one complete track circuit embodying my invention, it will be understood that the apparatus shown in Figs. 2, 3, and 4 may be substituted for the apparatus shown at the relay end of the section in Fig. 1. Likewise, the apparatus shown in Figs. 5 and 6 may be substituted for the appartus shown at the battery end of the section in Fig. 1. Furthermore, the apparatus shown in Fig. 2 or Fig. 4 may be combined with the apparatus shown in either Fig. 5 or Fig. 6 to provide four other combinations.

Although I have herein shown and described only a few forms of track circuits embodying my invention, it is understood that various changes and modifications may be made therein within the scope of the appended claims without departing from the spirit and scope of my invention.

Having thus described my invention, what I claim is:

1. In combination, a section of railway track, a direct current track relay connected across the rails at one end of said section, a source of direct current connected across the rails at the other end of said section, a source of alternating current at times supplied to the rails at said one end, and an asymmetric unit poled to pass current in the same direction as said direct current connected between the rails and said source of direct current.

2. In combination, a section of railway track, a direct current track relay connected across the rails at one end of said section, a source of direct current connected across the rails at the other end of said section, a transformer having its secondary winding connected in multiple with said direct current relay, means including the primary winding of said transformer for at times inducing alternating current in said secondary winding, and an asymmetric unit poled to pass energy in the same direction as said direct current connected between the rails and said source of direct current.

3. In combination, a section of railway track, a track relay for said section responsive only to unidirectional current, said track relay receiving current from the rails at one location in said section, a source of energy supplying to the track rails at another location in the track section unidirectional current of one relative polarity through a resistor which limits the current supplied to the track rails to a value sufficient to maintain the track relay picked up but insufficient to cause the track relay when released to become picked up, supply means for supplying alternating current to the circuit of the track relay and the track rails at said one location, and means connected with the track rails at said other location, said means being operative on the supply of alternating current thereto from said track rails to decrease the effective value of said resistor and thereby effect an increase in the value of the unidirectional current supplied to the track rails sufficient to cause the track relay when released to pick up.

4. In combination, a section of railway track, a track relay for said section responsive only to unidirectional energy, said track relay receiving current from the track rails at one location in said section, a source of energy supplying to the track rails at another location in said section unidirectional current of one relative polarity of a value insufficient to cause the relay to pick up when it is released but sufficient to cause the relay when picked up to remain picked up, a supply device operative on the supply of direct current thereto to supply alternating potential to a circuit through which current may be supplied to the circuit of the track relay and the track rails at said one location, a slow acting relay controlled by said track relay, said slow acting relay being conditioned to effect the supply of direct current to said supply device when said track relay is released and being conditioned to interrupt the supply of current to said supply device when the track relay is picked up, and means connected with the track rails at a point therein at said other location, said means being operative on the supply of alternating potential to the circuit of the track relay and the track rails by said supply means to effect an increase in the value of the current of said one relative polarity flowing in the circuit of the track relay sufficient to effect picking up of the track relay.

5. In combination, a section of railway track, a track relay for said section responsive only to unidirectional energy, said track relay receiving current from the rails at one location in said section, a source of energy supplying to the track rails at another location in said section unidirectional current of one relative polarity of a value insufficient to cause the relay to pick up when it is released but sufficient to cause the relay when picked up to remain picked up, supply means for supplying alternating current to said track rails at said one location, a transformer having a primary winding energized by current supplied from said track rails at said other location, and a relay receiving energy from the secondary winding of the said transformer, said relay being operative when energized to effect an increase in the value of the unidirectional current supplied from said source of energy to said track rails sufficient to cause the track relay when released to become picked up.

6. In combination, a section of railway track, a track relay for said section responsive only to unidirectional current, said track relay receiving current from the rails at one location in said section, said track relay being operative to pick up only in response to the supply of unidirectional current in excess of one degree and being operative when picked up to remain picked up in response to the supply of unidirectional current of a lesser degree, means supplying unidirectional current of one relative polarity to the track rails at another location in said section to effect energization of said track relay in excess of said lesser degree but less than said one degree when said track section is unoccupied, supply means for supplying an alternating potential to the circuit of the track rails and the track relay at the track relay location when and only when the track relay is released, and means connected to the rails at the supply location, said means being operative on the supply of alternating potential by said supply means to effect an increase in the flow of unidirectional current of said one relative polarity in the circuit of the track relay of such section to effect energization of said track relay in excess of said one degree.

7. In combination, a section of railway track, an electroresponsive device for said section responsive only to unidirectional current, said device being connected across the track rails at one location in said section, a source of unidirectional current connected across the track rails at another location in said section, means at said supply location connected to the track rails and being operative on the supply of alternating potential thereto to effect an increase in the flow of unidirectional current in the circuit of said electroresponsive device, and means associated with said electroresponsive device for supplying alternating potential to the track rails when said electroresponsive device is released.

8. In combination, a plurality of sections of railway track, a track relay for each section, each of said track relays being responsive only to unidirectional current and receiving current from the track rails of such section at one location in the section, each of said sections having associated therewith means for supplying unidirectional current to the track rails at a point adjacent the other end of such section, an alternating current supply device operative on the supply of current thereto to supply alternating potential to circuits through which potential may be supplied to the circuit of the track relay and track rails of each section at the track relay location, the track relay for each section controlling means operative when and only when said relay is released to complete the circuit through which alternating potential is supplied from said supply device to the circuit of the track relay and track rails of the section with which said track relay is associated, the track relay for each section being also operative when released to establish a circuit to supply current to said supply device, each section having means connected to the track rails of such section at said supply location and being operative on the supply of alternating potential to the circuit of the track relay and track rails of such section to effect an increase in the flow of unidirectional current in the circuit of the track relay of such section.

9. In combination, a section of railway track, a track relay for said section responsive only to unidirectional energy, said track relay receiving current from the rails at one location in said section, a source of energy supplying to the track rails at another location in said section unidirectional current of one relative polarity of a value insufficient to cause the relay to pick up when it is released but sufficient to cause the relay when picked up to remain picked up, supply means for supplying alternating potential to the circuit of the track rails and the track relay adjacent said one location, and means in series with the circuit of the track rails and the track relay at said other location, said means permitting current of said one relative polarity only to flow in the circuit of the track rails and the track relay, whereby on the supply of alternating potential by said supply means there is an increase in the value of the current of said one relative polarity flowing in the winding of the track relay sufficient to effect picking up of the track relay.

10. In combination, a section of railway track, a track relay for said section responsive only to unidirectional energy, said track relay receiving current from the rails at one location in said section, a source of energy supplying to the track rails at another location in said section unidirectional current of one relative polarity of a value insufficient to cause the relay to pick up when it is released but sufficient to cause the relay when picked up to remain picked up, supply means for supplying alternating potential to the circuit of the track rails and the track relay adjacent said one location, and means in series with the circuit of the track rails and the track relay at said other location, said means permitting current of said one relative polarity only to flow in the circuit of the track rails and the track relay, whereby on the supply of alternating potential by said supply means there is an increase in the value of the current of said one relative polarity flowing in the winding of the track relay sufficient to effect picking up of the track relay, the supply means being controlled by the track relay in such manner that the supply means is operative to supply alternating potential to the circuit of the track relay and track rails when the track relay is released and is rendered ineffective to supply such potential on picking up of the track relay.

11. In combination, a section of railway track, a track relay for said section responsive only to unidirectional energy, said track relay receiving current from the track rails at one location in said section, a source of energy supplying to the track rails at another location in said section unidirectional current of one relative polarity of a value insufficient to cause the relay to pick up when it is released but sufficient to cause the relay when picked up to remain picked up, a supply device operative on the supply of direct current thereto to supply alternating potential to a circuit through which current may be supplied to the circuit of the track relay and track rails of said section at said one location, means operative when the track relay is released to effect the supply of direct current to said supply device and operative when the track relay is picked up to interrupt the supply of direct current to said supply device, and means connected with the track rails at said other location, said means being operative on the supply of alternating potential to the circuit of the track relay and the track rails by said supply means to effect an increase in the value of the current of said one relative polarity flowing in the circuit of the track relay sufficient to effect picking up of the track relay.

GEORGE R. PFLASTERER.